US008700232B2

(12) United States Patent
Caillaud et al.

(10) Patent No.: US 8,700,232 B2
(45) Date of Patent: Apr. 15, 2014

(54) METHOD AND DEVICE FOR CENTRALIZED MANAGEMENT OF TASKS TO BE CARRIED OUT BY A CREW OF AN AIRCRAFT DURING FLIGHT

(75) Inventors: Christophe Caillaud, Blagnac (FR); François Coulmeau, Seilh (FR); Gilles Jacques Yves Francois, Toulouse (FR)

(73) Assignee: Thales, Neuilly sur Seine (FR)

( * ) Notice: Subject to any disclaimer, the term of this patent is extended or adjusted under 35 U.S.C. 154(b) by 352 days.

(21) Appl. No.: 12/980,465

(22) Filed: Dec. 29, 2010

(65) Prior Publication Data
US 2011/0160937 A1 Jun. 30, 2011

(30) Foreign Application Priority Data

Dec. 30, 2009 (FR) ..................................... 09 06400

(51) Int. Cl.
*G01C 23/00* (2006.01)
*G01C 5/00* (2006.01)

(52) U.S. Cl.
USPC .................................................. 701/3; 701/9

(58) Field of Classification Search
None
See application file for complete search history.

(56) References Cited

U.S. PATENT DOCUMENTS

| 6,021,262 | A  |   | 2/2000  | Cote et al.            |
|-----------|----|---|---------|------------------------|
| 6,122,572 | A  | * | 9/2000  | Yavnai ............................. 701/23 |
| 6,317,659 | B1 | * | 11/2001 | Lindsley et al. ................... 701/1 |
| 2005/0149238 | A1 | * | 7/2005 | Stefani et al. .................... 701/33 |
| 2006/0149432 | A1 | * | 7/2006 | Robinson ........................... 701/3 |
| 2010/0066565 | A1 | * | 3/2010 | Francois et al. .............. 340/963 |
| 2010/0161157 | A1 | * | 6/2010 | Guilley et al. .................... 701/3 |

FOREIGN PATENT DOCUMENTS

| EP | 0647903 | 4/1995 |
| EP | 0838757 | 4/1998 |
| FR | 2935818 | 3/2010 |

\* cited by examiner

*Primary Examiner* — Mussa A Shaawat
(74) *Attorney, Agent, or Firm* — Baker & Hostetler LLP (57) ABSTRACT

The present invention relates to a method and a device for centralized management of tasks to be carried out by a crew in the course of an aircraft flight. The method uses onboard navigation aid systems, such as a flight management system, a system for managing in-flight alerts for the implementation of the following steps: creation of a task by the flight management system; scheduling of the tasks by a system for managing alerts; and task execution by the system for managing alerts.

13 Claims, 8 Drawing Sheets

METHOD AND DEVICE FOR CENTRALIZED MANAGEMENT OF TASKS TO BE CARRIED OUT BY A CREW OF AN AIRCRAFT DURING FLIGHT

CROSS-REFERENCE TO RELATED APPLICATION

This application claims priority to foreign French patent application No. FR 09 06400, filed on Dec. 30, 2009, the disclosure of which is incorporated by reference in its entirety.

FIELD OF THE INVENTION

The present invention relates to the field of onboard avionics. More particularly, the invention relates to a method and a device for centralized management of tasks to be carried out by a crew in the course of an aircraft flight. The invention is applied to navigation aid systems aboard an aircraft, for example.

BACKGROUND OF THE INVENTION

For a few years, thought has been given to the problems related to the increase in air traffic and notably to the significant workload that this involves for aircraft crews. Specifically, the number of tasks to be carried out by the crew is increasing, while the trend is to reduce the number of crew members.

The automation of certain flight management systems makes it possible to free the crew from certain routine tasks not requiring human expertise. For example, certain systems make it possible to manage instructions originating from an air traffic controller or an airline. The management of these instructions is done by way of communication-routing equipment and their graphical interface. When certain instructions have an impact on the conduct of the flight, for example on the flight plan, the said instructions may be inserted in a semi-automatic or entirely automatic manner into computers responsible for flight management. However, the integration of these automation facilities into computers is expensive and remains fairly limited. Certain instructions are therefore taken into account in an entirely manual manner. Moreover, voice or digital messages arising from an airline as well as the various tasks to be carried out in the course of the flight are hardly, if at all, integrated into the embedded cockpit systems; when they are integrated, this is done in an inhomogeneous manner. The crew may not therefore have a chronological overall picture of the tasks to be carried out in the course of the flight. It is difficult for the crew, under these conditions, to schedule their work so as to split the workload in an optimal manner. Thus the crew may find themselves in situations where they must process a number of important tasks concomitantly. This may lead for example to task omissions and be detrimental to flight safety.

SUMMARY OF THE INVENTION

Embodiments of the invention remedies at least the aforementioned drawbacks. The invention includes a method for centralized management of tasks to be carried out by a crew in the course of a flight of an aircraft. The aircraft comprises notably systems for flight management, for managing in-flight alerts. The method comprises at least the following steps:

- a first step of task creation, carried out by the flight management system;
- a second step of scheduling tasks, carried out by the system for managing in-flight alerts, the said step of scheduling tasks comprising a step of inserting the task created into an ordered tasks list;
- a third step of executing tasks, carried out by the system for managing in-flight alerts.

The task creation step can use digital instructions originating from systems external to the flight management system to create a task. The task creation can use instructions entered by an operator on a first man-machine interface to create a task.

The scheduling of tasks can advantageously be carried out by a function for scheduling alerts of the system for managing in-flight alerts.

A task created can notably comprise:
  a time;
  an execution condition;
  an instruction to be executed.

The task may be created with a time corresponding to a predicted time of realization of the execution condition, the said predicted time being computed by the flight management system.

The method can advantageously comprise a step of updating the predicted time of the tasks by the flight management system.

In an embodiment, the step of updating the predicted time of the tasks may be carried out cyclically by the flight management system.

The method can comprise a step of transmitting a task to be executed to the flight management system by the system for managing in-flight alerts.

The invention also provides device for centralized management of tasks to be carried out by a crew in the course of a flight of an aircraft. The aircraft comprises notably a flight management system, a system for managing in-flight alerts. The device according to the invention comprises notably:

- a first function for task creation carried out by the flight management system;
- a second function for scheduling tasks carried out by the system for managing in-flight alerts, the said task scheduling function inserting the task created by the function for creating tasks into a tasks list managed by the function for scheduling tasks;
- a third function for executing tasks carried out by the system for managing in-flight alerts.

The task creation function can advantageously use digital instructions originating from systems external to the flight management system to create a task. The external systems are notably connected to the flight management system by way of a unit for managing the communications of the aircraft.

The task creation function can advantageously use instructions entered by an operator on a first man-machine interface to create a task. The first man-machine interface can notably transfer the instructions entered to the task creation function.

The device can advantageously use an integrated man-machine interface to perform a display of the list of tasks, and to recover instructions entered by the crew to create a task.

The invention makes it possible to integrate the set of tasks to be carried out by a crew of an aircraft, and to reduce the workload of the crew.

BRIEF DESCRIPTION OF THE DRAWINGS

Other characteristics and advantages of the invention will become more readily apparent with the aid of the description which follows, given by way of nonlimiting illustration with regard to the appended drawings, which represent.

DETAILED DESCRIPTION

The acronyms used in the present patent application are listed and explained in the following table:

| Acronym | Expression | Meaning |
|---|---|---|
| AOC | Air Operation Centre | |
| ATC | Air Traffic Control | |
| CMU | Communications Management Unit | |
| DB | Data Base | |
| FPLN | Flight Plan | |
| FMS | Flight Management System | |
| FWS | Flight Warning System | Centralized in-flight alert system |
| GPS | Global Positioning system | |
| MMI | Man-machine interface | |
| INR | Inertial Navigation System | |
| PERF | Performance | |
| PRED | Prediction | |
| VHF | Very High Frequency | |
| VMO | Velocity Maximum Operating | Maximum speed of operation |

Figure 1:
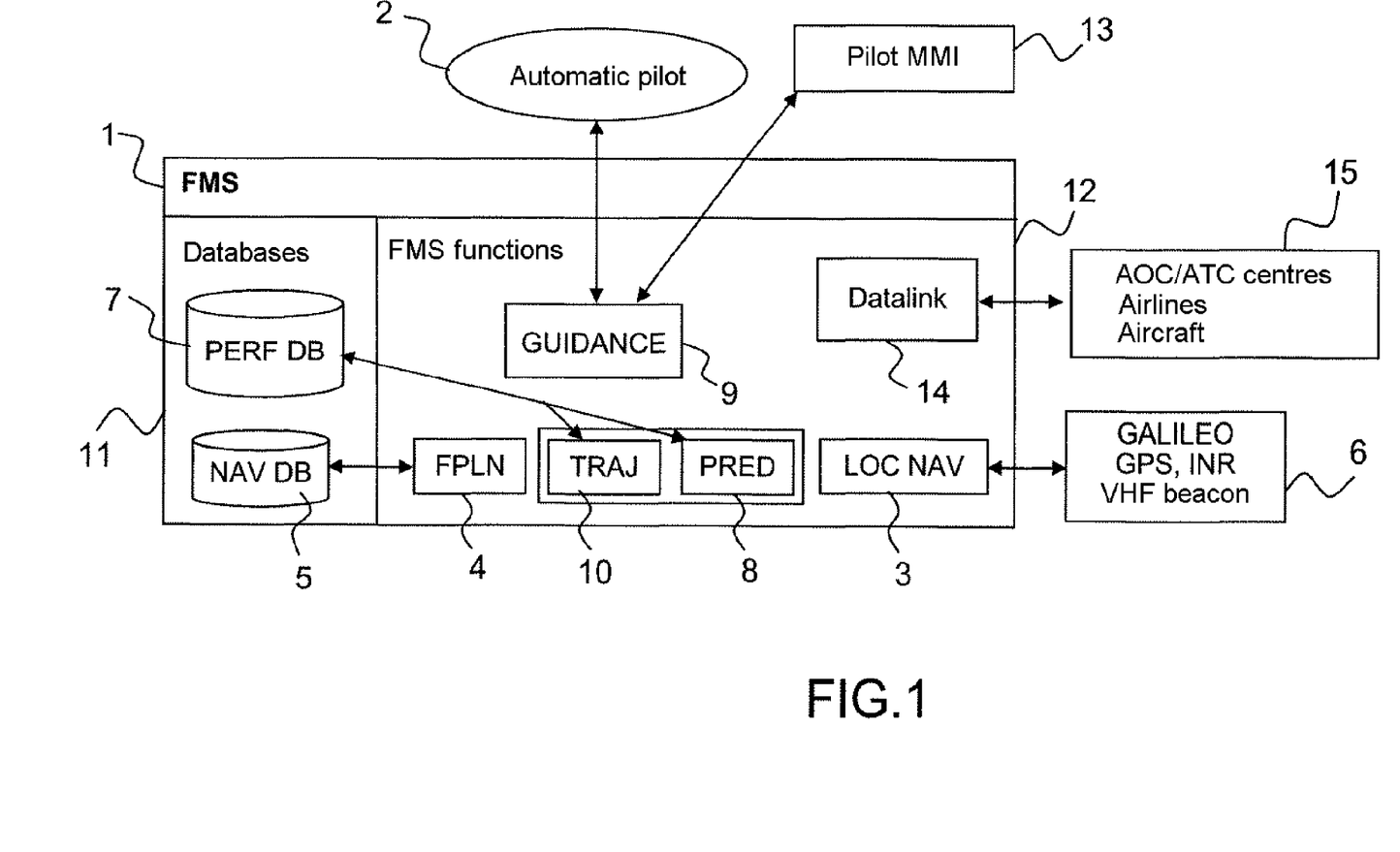
FIG. 1: a simplified flowchart of a flight management system according to the prior art.

FIG. 1 represents a flight management system 1 of an aircraft. The flight management system is commonly named FMS 1, the acronym standing for the expression Flight Monitoring System. The flight management system is implemented by an embedded computer onboard an aircraft. The FMS 1 determines notably a geometry of a flight plan profile followed by the aircraft. The profile of the flight plan is computed in four dimensions: three spatial dimensions and a time/speed profile dimension. The flight management system also transmits to a pilot, via a pilot MMI 13, or to an automatic pilot 2, guidance setpoints so as to follow the computed profile. FIG. 1 represents various usual functions 12 of an FMS. The functions 12 of an FMS are notably described in the ARINC 702A standard found in the following document: "Advanced Flight Management Computer System, December 1996". Only the main functions of an FMS are represented in FIG. 1. The FMS also comprises databases 11 providing the functions 12 with the data necessary for the various computations executed by the said functions 12.

A first function of the FMS 1 may be a navigation function 3 named LOCNAV. The function LOCNAV 3 performs optimal geographical location of the aircraft as a function of the geo-location means onboard the aircraft. For example the following means may be used by the function LOCNAV 3: a GPS system 6, a GALILEO system 6, VHF radio beacons 6, INR inertial platforms 6.

A second function of the FMS 2 may be a flight plan management function 4. The flight plan management function may be named by the expression FPLN. The function FPLN 4 allows entry and management of component geographical elements making up a skeleton of a route to be followed by the aircraft. For example, the function FPLN 4 allows the entry of departure procedures, of arrival procedures, of waypoints, of air routes.

The FMS 1 can also comprise a first database NAV DB 5 connected to the function FPLN 4. The database NAV DB 5 makes it possible to construct geographical routes and flight procedures on the basis of data such as geographical points, beacons, interception segments, altitude segments.

The FMS 1 comprises a second database PERF DB 7 containing notably aircraft performance data such as: aerodynamic parameters, characteristics of the engines of the aircraft.

A third function of the FMS 1 may be a function for computing a lateral trajectory 10 for the flight plan. The lateral trajectory computation function can also be named TRAJ 10. The function TRAJ 10 constructs a continuous trajectory on the basis of points of the flight plan while complying with the aircraft performance provided by the second database PERF DB 7.

A fourth function of the FMS 1 may be a prediction function 8, named PRED 8. The prediction function 8 constructs an optimized vertical profile on the lateral trajectory of the flight plan of the aircraft, provided by the function TRAJ 10, by using the data of the second database PERF DB 7.

A fifth function of the FMS 1 may be a guidance function 9 or GUIDANCE. The guidance function 9 provides flight commands to the automatic pilot 2 or to a pilot MMI 13 so as to guide the aircraft in the lateral and vertical planes so that the said aircraft follows the trajectory envisaged in the flight plan. The guidance function 9 computes the flight commands by optimizing notably the speed of the aircraft.

The FMS 1 also comprises digital data links 14, DATA LINK 14. The data links 14 allow for example the FMS 1 to communicate with ground air traffic control centres such as AOC centres 15, ATC centres 15, with airlines 15, with other aircraft 15.

One or more flight plans may be entered on an MMI 16 by the pilot or else received by data link 14. A flight plan comprises data present in the database NAV DB 5. A flight plan comprises notably a succession of segments called "legs". Each "leg" is formed of two terminations and of a geometry, such as a turn, a great circle, a rhumb line. The "legs" are standardized in the AEEC document of the ARINC 424 standard. Thereafter, the pilot can enter parameters such as the weight of the aircraft, a flight plan to be followed, a range of cruising flight levels, one or more optimization criteria desired for the flight. The parameters entered allow the functions TRAJ 10 and PRED 8 to compute respectively the lateral trajectory and the vertical profile of the flight minimizing for example a cost criterion.

However, the functions accessible to the pilot via an FMS and in particular the management of manual tasks are limited. For example, the numerical specifications relating to the ATC are based on a simple check of conditions; the next action to be carried out is in general retained by the CMU. Another example is a temporal marker function which prompts an alarm when the time specified in the marker is reached. However, the temporal marker function does not make it possible to enter a context for the alarm. As regards the numerical specifications relating to the AOC, it is not possible to plan instructions tied to them.

Figure 2:
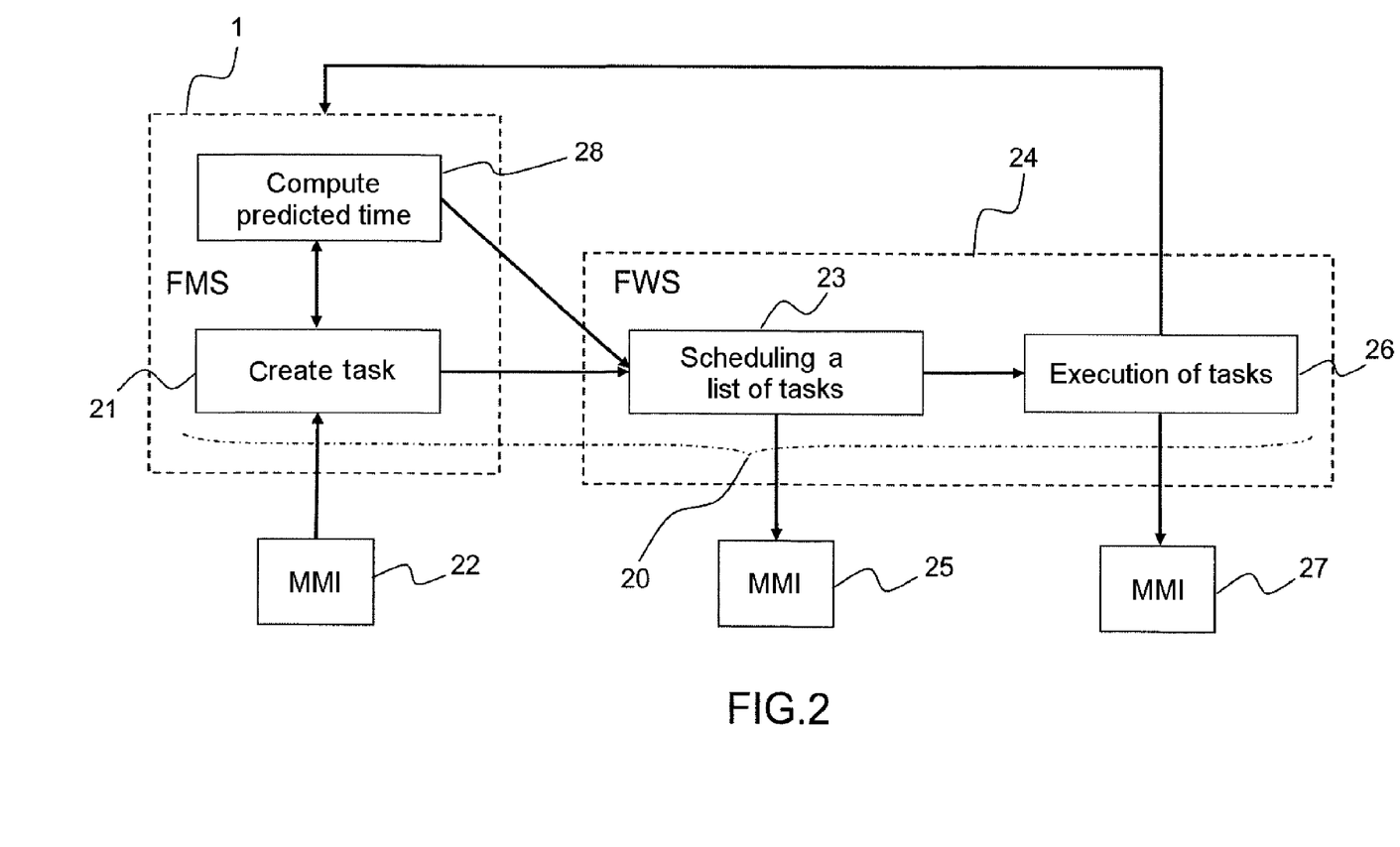
FIG. 2: a flowchart of various steps of the method according to the invention.

FIG. 2 represents various possible steps of the method for centralized management of tasks 20 according to the invention.

A first step 21 is a task creation step. The task creation step 21 can for example be carried out by a task creation function carried out by the FMS 1. A task may be created on receipt of parameters of a task, which are entered by a crew member on a first MMI 22. For example, a crew member can choose a variable of the task, a time associated with the variable, an instruction associated with the variable. A task can also be created on receipt of digital instructions originating from a system external to the aircraft, for example in communication with the FMS 1. Other systems of the aircraft can also transmit instructions for the creation of a task. A task may also be created on the basis of an event originating from the FMS 1, to conduct a check-list, to execute a standard procedure, for example.

Figure 3:
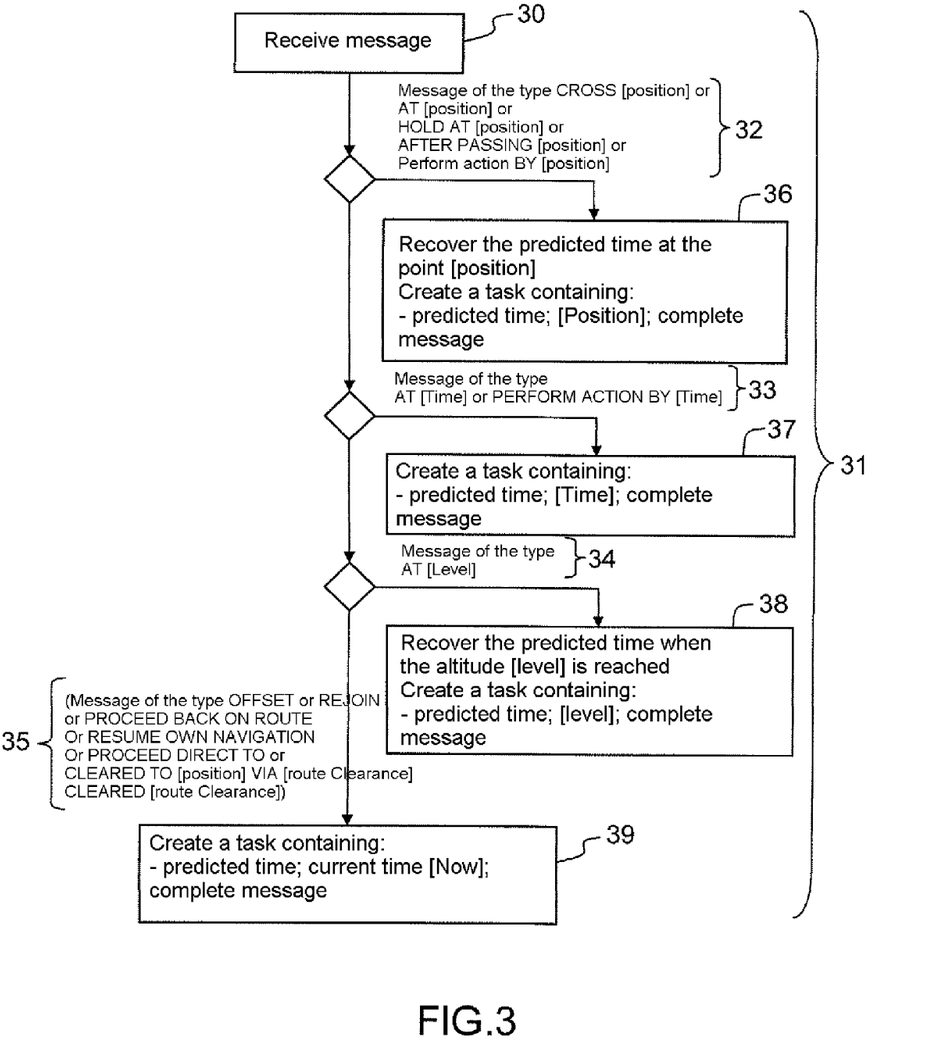
FIG. 3: an exemplary processing by the method according to the invention of a task creation step.

The FMS 1 can for example receive instructions from an ATC or AOC centre and use them to create a task so as to process the said instructions. An example of taking an ATC instruction into account to create a task is represented in FIG. 3.

A task can also be entered manually by a member of the crew subsequently called an operator. Via the first MMI 22, for example, the operator can select a variable and associate therewith a free text, or an instruction calling upon a functionality of the FMS 1. The first MMI 22 may be the MMI 13 of the FMS 1. The types of variables that may be entered are notably the following: a position, a time, an altitude, a speed, a regaining of an offset or a return to a trajectory, a major event of the flight. The variable entered can correspond to a condition for triggering the execution of the task: the variable can represent a value of a parameter corresponding to the type of the variable. When the parameter reaches the value specified for the variable, the condition for triggering the task is fulfilled. Among the types of variables:

- a major event of the flight may be a particular flight phase, a mode of guidance;
- a position may be, in a nonlimiting manner: a waypoint of the flight plan, a geographical position, a reference to a position;
- a speed may be for example a VMO.

Thereafter the operator can associate, via the first MMI 22, an instruction to be accomplished when the defined value of the variable is reached. The instruction may be optional if the operator wants only an alarm when the condition specified by the variable is realized.

The FMS 1 thereafter creates a task on the basis of the information cited hereinabove. The task created comprises the following information:

- a predicted time, corresponding to the realization of the condition defined by the variable;
- the variable;
- the instruction to be carried out.

The predicted time may be provided by the functions PRED 8 and TRAJ 10 of the FMS 1. The predicted time can also correspond to the time entered by the operator in the guise of variable.

Other parameters may be added such as an importance indicator for the task. For example a task may be: critical, necessary, compulsory. Advantageously such an indicator can allow the crew to choose between two tasks having to be processed simultaneously. Another indicator can make it possible to specify an origin of the task, for example: manual, AOC, ATC, FMS, other system.

Once the task has been created by the task creation function of the FMS 1, the task is transmitted to a function for scheduling tasks 23 which inserts the task created into a list of tasks. A second step of the method according to the invention can therefore be a step 23 of scheduling a list of tasks. A scheduling criterion may be, for example, a chronological criterion, taking into account the predicted time. Regularly, the predicted time of each task may be updated by the functions PRED 8 and TRAJ 10 of the FMS 1. Once the predicted times have been updated, a rescheduling of the list of tasks is performed if necessary. A second step of the method according to the invention can therefore be a step of scheduling the task list 23. The scheduling step 23 may be carried out by a function of an FWS 24. An FWS is a system for centralized management of alerts. Advantageously, an FWS 24 according to the prior art comprises functions for managing a list of alarms, including a function for scheduling the list of alarms. The mechanisms for managing a list of alarms may be easily adapted to the management of a task list. The ordered tasks list may be displayed to the crew on a second MMI 25. The second MMI 25 may be an MMI of the FWS 24.

A third step 26 of the method according to the invention may be a step of executing a task 26. A task execution function 26 extracts a task from the task list when the condition for executing the task is fulfilled. The task execution function 26 can then display the task on a third MMI 27. The step of executing a task 26 may be carried out by a function of the FWS 24.

FIG. 3 represents various processings implemented for the creation of a task 31 on receipt of instructions originating from an external centre such as an AOC or an ATC. The instructions may be received in the form of textual messages 30 having predefined types. Depending on the types of messages received, the tasks are not created in the same manner. For example, on receipt of a message 30, if the message 30 is of first types 32:

CROSS, signifying "crossing";
AT;
HOLD AT, signifying "wait at";
AFTER PASSING;
PERFORM ACTION BY, signifying "carry out an action on passing";

followed by a position indication and the complete textual message 30, then the creation of a first task 36 is performed by recovering the predicted time at which the aircraft passes the position, on the flight plan. The first task 36 thus created comprises the predicted time, the position and the complete textual message.

If the message is of the following second types 33: AT; PERFORM ACTION BY, and comprises: a time, denoted by TIME in FIG. 3, and a complete textual message, then a second task 37 created comprises a predicted time, which is the time of the message: TIME, the time, and the complete textual message 30.

If the message is of third type 34: AT followed by an altitude denoted "level" in FIG. 3, then the task creation recovers the predicted time of reaching the altitude on the flight plan and creates a task comprising the following parameters: the predicted time, the altitude, the complete message 30.

If the message is of the following fourth types 35:
OFFSET, signifying detour;
REJOIN;
PROCEED BACK ON ROUTE, signifying proceed to return to the route;
RESUME OWN NAVIGATION, signifying revert to the navigation of the aircraft;
PROCEED DIRECT TO, signifying rejoin directly;
CLEARED TO, signifying authorization to go to, followed by a position, followed by VIA, signifying by, followed by a "ROUTE CLEARANCE";

CLEARED, followed by a "ROUTE CLEARANCE"; then a fourth task created 39 comprises a predicted time corresponding to the current time, denoted "Now" in FIG. 3, and the complete textual message 30.

Thus, by virtue of the method according to the invention, the messages originating from external centres such as an ATC or an AOC can be taken into account in an at least partially automated manner. Indeed, the creation of a task corresponding to the message received frees the crew from the task of first analysis of the message. Moreover, if the instruction must not be executed immediately, advantageously, the method according to the invention makes it possible to remind the crew of the instruction to be executed at the opportune moment.

FIGS. 4a to 4g represent an exemplary manual creation of a task via the first MMI 22, for example the MMI 13 of the FMS 1. The MMI 13 of the FMS 1 is composed notably of a display panel 40, of a pad 41 comprising keys for entering alphanumeric information and keys for accessing functionalities of the FMS 1 and, on two vertical sides of the panel 40, keys 42 for accessing items displayed on the display panel 40.

Figure 4A:
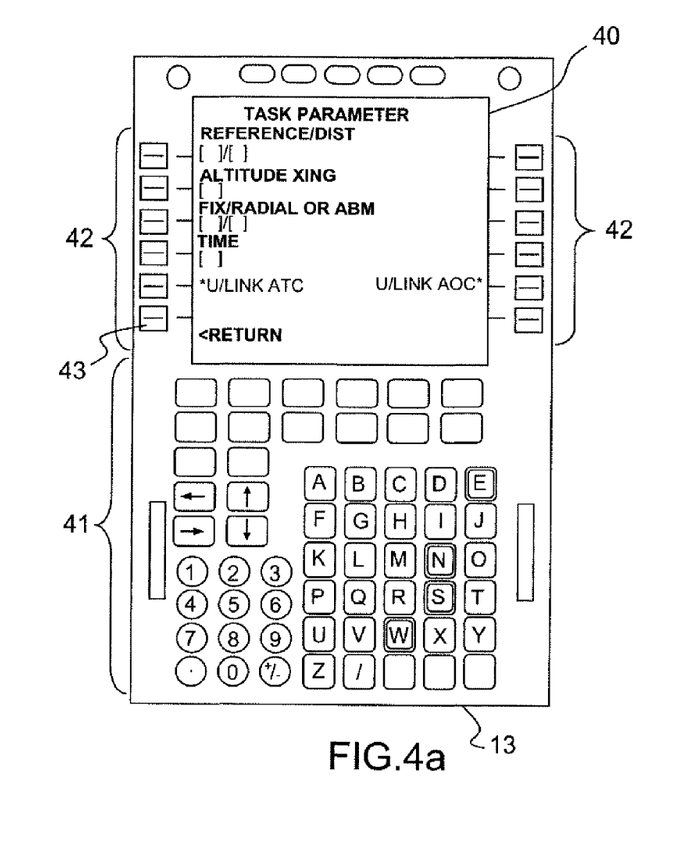
FIGS. 4a to 4g: an exemplary implementation of the method according to the invention.

In FIG. 4a, the panel 40 displays a template for entering parameters of a task, "TASK PARAMETER", for manual task-creation 21. The template comprises several items detailed hereinafter.

A task can therefore be created for example on receipt of a message originating from an external centre: "U/LINK ATC" when the message originates from an ATC centre or "U/LINK AOC" when the message originates from an AOC centre.

Figure 4B:
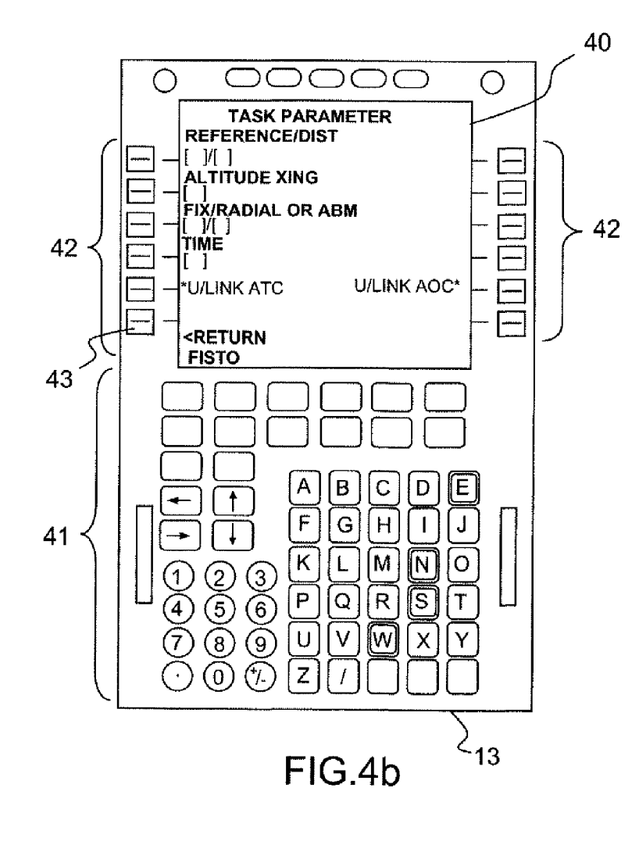
Figure 4C:
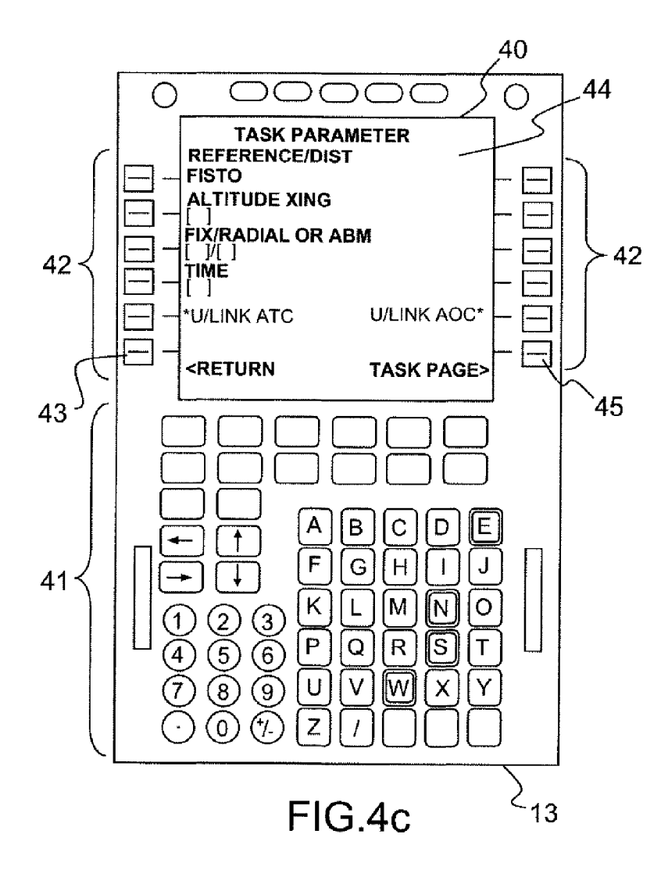

A first parameter may be a reference-based position parameter named "REFERENCE/DIST" in FIGS. 4a to 4c. A second parameter may be an altitude parameter named "ALTITUDE XING" in FIGS. 4a to 4c. A third parameter may be a position parameter identified by "FIX/RADIAL OR ABM" in FIGS. 4a to 4c. A fourth parameter may be a time, "TIME". A first item "RETURN" makes it possible to validate an operator's entry by actuating a first button 43, forming part of the access keys 42, the said first button 43 being situated alongside the first item "RETURN".

Figure 4D:
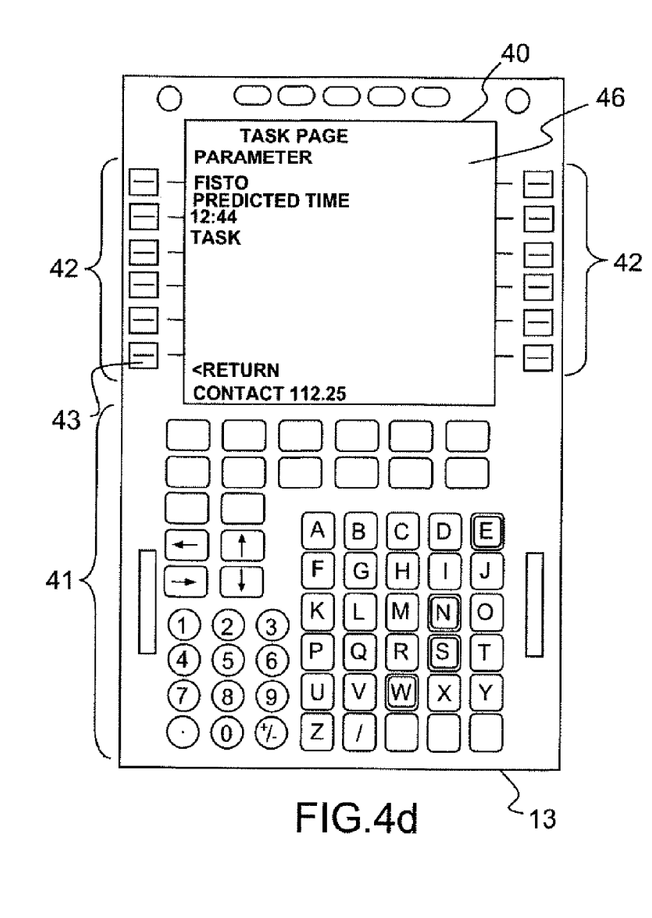

In FIG. 4b, an operator has entered a name of a reference to a position: "FISTO". By actuating the first button 43, the operator validates the entry and obtains a screen 44 represented in FIG. 4c. A second button 45, forming part of the access keys 42, is situated alongside a second item "TASK PAGE". When the operator actuates the second button 45, the task is created and a page 46, named "TASK PAGE", represented in FIG. 4d, appears on the display panel 40. The page 46 presents the task created to the operator and the task is then displayed in the form of a list comprising:

- a "PARAMETER" attribute having as value FISTO and representing the variable of the task;
- a "PREDICTED TIME" attribute representing the predicted time, computed by the functions PRED 8 and TRAJ 10, of the FMS 1;
- a "TASK" attribute representing the instruction to be carried out by the task.

Figure 4E:
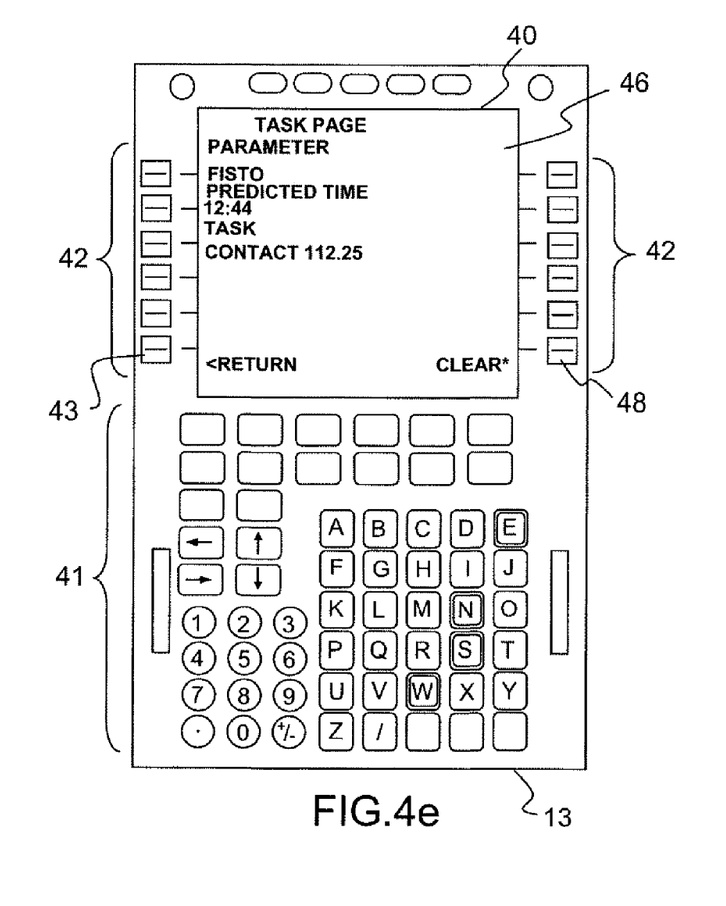

The operator can then enter an instruction: the instruction entered in the example is the following: "CONTACT 112.25", representing a frequency to be contacted. The operator actuates the first button 43 to validate the entry of the instruction. Once validated, the instruction appears under a third item "TASK" such as represented in FIG. 4e. A fourth item "CLEAR" 48 then appears on the display panel 40, making it possible to erase the task created by the operator.

Figure 4F:
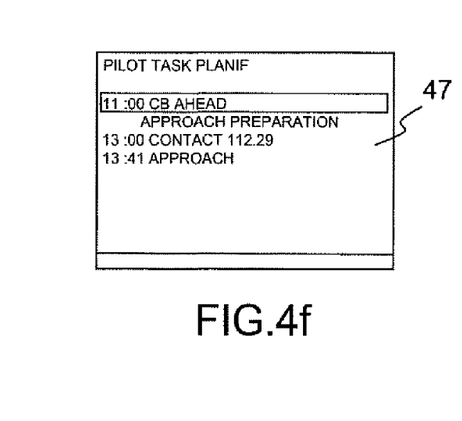

FIG. 4f represents a display screen 47 for the list of the tasks of the pilot, named "PILOT TASK PLANIF". The display screen can appear on the second MMI 25 of the FWS for example. For the example, four tasks are represented:
- a first task "CB AHEAD" with a predicted time at 11:00;
- a second task of approach preparation: "APPROACH PREPARATION", following the first task;
- a third task, entered by the operator in the example: "CONTACT 112.25" at a predicted time of 13:00;
- a fourth task of approach: "APPROACH", the predicted time of which is 13:41.

Figure 4G:
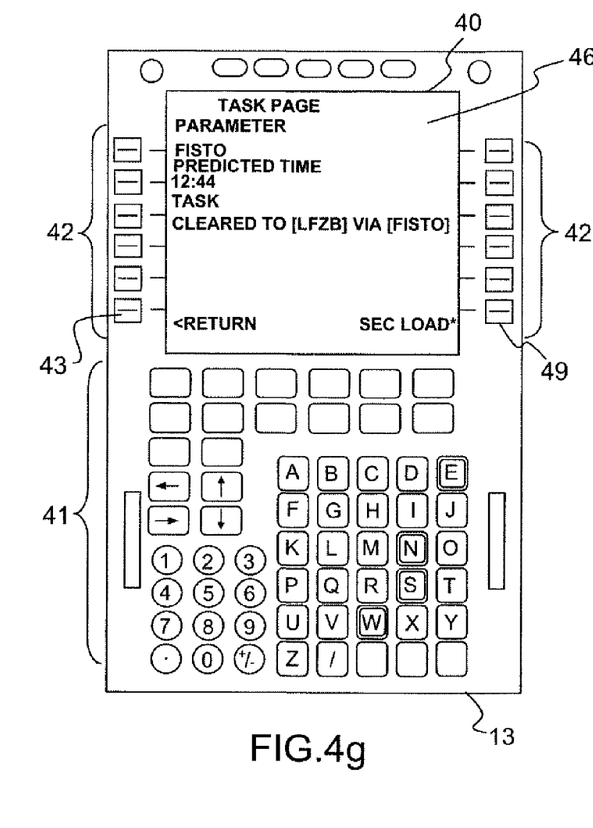

On the sequencing of the point "FISTO", the task page "TASK PAGE" is redisplayed on the display screen 40, represented in FIG. 4g. The task page displayed comprises a predicted time updated by the functions PRED 8 and TRAJ 10, of the FMS 1: 12:44. The predicted time is updated as a function of the progress of the aircraft on its flight plan. Contact with the frequency 112.25 having been established automatically, a message is recovered by the FMS 1. The said message originating for example from an ATC centre is the following: "CLEARED TO [LFBZ] VIA [FISTO]". The message therefore gives the authorization to rejoin the airport with code name LFBZ via the point FISTO. The FMS 1 then proposes, via the first MMI 13, to integrate the instruction "CLEARED TO [LFBZ] VIA [FISTO]" into the secondary flight plan by way of a fifth item "SEC LOAD" 49 of the display panel, presented in FIG. 4g.

Advantageously, the task processing device with the FMS 1 makes it possible to automate the executions of the tasks according to the information at the disposal of the FMS system 1.

Figure 5A:
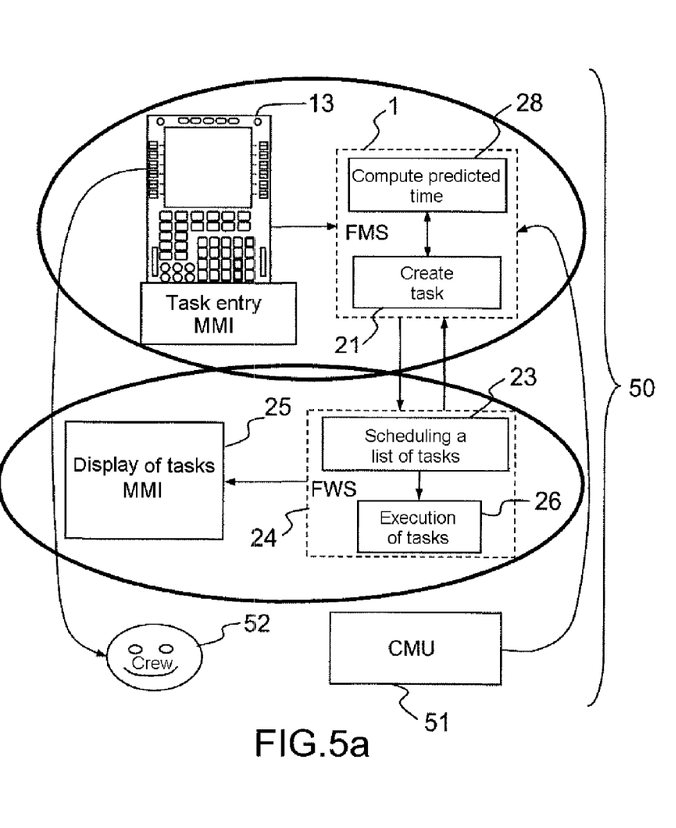
FIG. 5a: a first exemplary system architecture implementing the device according to the invention.
Figure 5B:
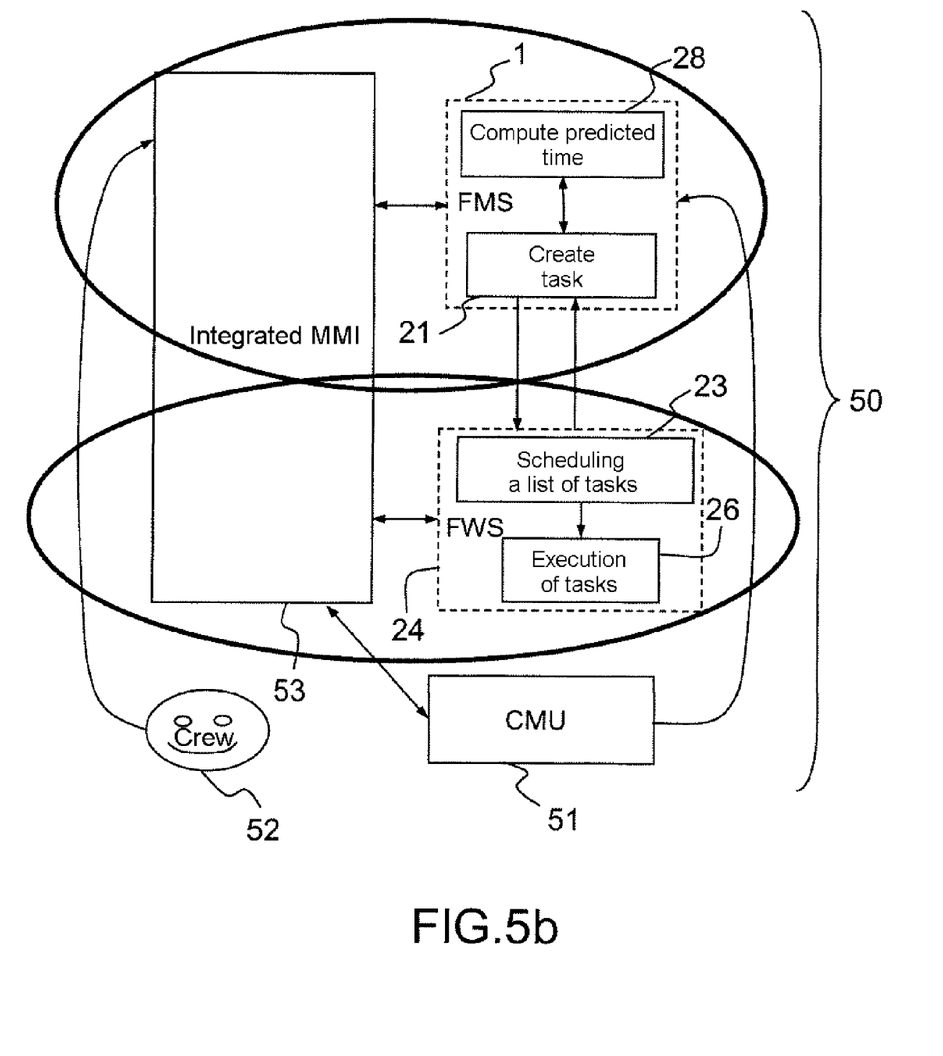
FIG. 5b: a second exemplary system architecture implementing the device according to the invention.

FIGS. 5a and 5b represent two examples of possible architectures of a system 50 implementing the method according to the invention and including the device according to the invention. The two architectures represented comprise an FMS 1, an FWS 24, a CMU.

In the first exemplary architecture represented in FIG. 5a, the crew 52 can enter tasks on the MMI 13 of the FMS 1. The crew can also via an MMI of the CMU 51 load a message received by the CMU into the FMS 1. The FMS 1 can then create a task to be carried out according to the instructions of the message received by the CMU. The FMS 1 also associates with the task a predicted time for its execution. The predicted time computed by the FMS 1 will be updated cyclically throughout the lifetime of the task. Once the task has been created, the latter is transmitted to the FWS 24 which carries out the scheduling of the list of the tasks 23 that it manages. Once the list has been rescheduled, the FWS 24 displays the list of tasks on its MMI 25. When the time predicted by the FMS 1 is reached, the FWS 24 can dispatch to the FMS 1 a request for execution of the task associated with the message received by the CMU 51. The FMS 1 can then execute the task and then delete the latter once it has been carried out.

In the second exemplary architecture represented in FIG. 5b, the MMIs 13 and 25 respectively MMI of the FMS 1, of the FWS 24, and of the CMU 51 are replaced with an integrated MMI 53. The integrated MMI 53 routes the data entered, the tasks and to the appropriate system FMS 1, FWS 24 or CMU 51. The integrated MMI also displays all the data to be displayed originating from the FMS 1, from the FWS 24 and from the CMU 51.

Thus the manual entries of instructions, the requests for loading digital messages received by the CMU 51 are dispatched to the FMS 1 by the centralized MMI 53.

Advantageously, the device according to the invention may be easily adapted to an existing architecture such as represented in FIG. 5a. The device according to the invention can also be embodied by an architecture comprising an integrated MMI 53. Advantageously, the use of an integrated MMI allows the crew to have all the information and all the interfaces that they need in order to manage the tasks on one and the same MMI.

Advantageously, the invention allows centralized management of all the tasks that are to be carried out by a crew in the course of a flight.

The invention also allows better temporal planning of the tasks to be accomplished; the crew can thus by virtue of the invention smooth its workload so as to avoid load peaks.

The method and device according to the invention also make it possible to lighten the workload of the crew by automating on the one hand the creation of certain tasks and on the other hand by executing in an automatic manner those tasks which can be so executed.

What is claimed is:

1. A method for managing tasks carried out by a crew in the course of a flight of an aircraft, the aircraft comprising a system for flight management and a system for managing in-flight alerts,
   the system for flight management being configured for determining a geometry of a flight plan profile followed by the aircraft and for transmitting guidance setpoints so as to follow a computed profile,
   the system for managing in-flights alerts being configured for centralizing management of alerts and for managing a list of alarms,
   said systems being distinct and configured to cooperate in order to perform a centralized managing of tasks, said method comprising:
   creating a task, the creating carried out by said flight management system;
   transmitting the task to the system for managing in-flight alerts,
   scheduling tasks, said scheduling tasks carried out by the system for managing in-flight alerts, said step of scheduling tasks comprising a step of inserting the task created into an ordered tasks list; and
   executing tasks, comprising extracting a task from said ordered tasks list when a condition for executing the task is fulfilled, the executing carried out by the system for managing in-flight alerts.

2. The method according to claim 1, wherein the task creation step uses digital instructions originating from systems external to the flight management system to create a task.

3. The method according to claim 1, wherein the task creation step uses instructions entered by an operator on a first man-machine interface to create a task.

4. The method according to claim 1, wherein the second step of scheduling of tasks is carried out by a function for scheduling alerts of the system for managing in-flight alerts.

5. The method according to claim 1, wherein a created task comprises:
   a time;
   an execution condition; and
   an instruction to be executed.

6. The method according to claim 5, wherein the task is created with a time corresponding to a predicted time of realization of the execution condition, said predicted time being computed by the flight management system.

7. The method according to claim 6, further comprising a step of updating the predicted time of the tasks by the flight management system.

8. The method according to claim 7, wherein the step of updating the predicted time of the tasks is carried out cyclically by the flight management system.

9. The method according to claim 1, further comprising a step of transmitting a task to be executed to the flight management system by the system for managing in-flight alerts.

10. A device for centralized management of tasks carried out by a crew in the course of a flight of an aircraft, said aircraft comprising a flight management system and a system for managing in-flight alerts,
    the flight management system being configured for determining a geometry of a flight plan profile followed by the aircraft and for transmitting guidance setpoints so as to follow a computed profile,
    the system for managing in-flights alerts being configured for centralizing management of alerts and for managing a list of alarms,
    said systems being distinct and configured to cooperate in order to perform a centralized the managing of tasks, said device comprising:
    a first part for task creation carried out by the flight management system, wherein the task is transmitted to the system for managing in-flight alerts;
    a second part for scheduling tasks carried out by the system for managing in-flight alerts, said task scheduling function inserting the task created by the function for creating tasks into a tasks list managed by the function for scheduling tasks; and
    a third part for executing tasks carried out by the system for managing in-flight alerts, said third part comprising extracting a task from said ordered tasks list when a condition for executing the task is fulfilled.

11. The device according to claim 10, wherein the task creation part uses digital instructions originating from systems external to the flight management system to create a task, said external systems being connected to the flight management system by way of a unit for managing the communications of the aircraft.

12. The device according to claim 10, wherein the task creation part uses instructions entered by an operator on a first man-machine interface to create a task, said first man-machine interface transferring the instructions entered to the task creation part.

13. The device according to claim 10, further comprising an integrated man-machine interface to perform a display of the list of tasks, and to recover instructions entered by the crew to create a task.

* * * * *